United States Patent
Subramaniam et al.

(10) Patent No.: US 10,084,372 B1
(45) Date of Patent: Sep. 25, 2018

(54) HVAC AND/OR REFRIGERATION USING POWER FACTOR CORRECTION

(71) Applicant: Lennox Industries Inc., Richardson, TX (US)

(72) Inventors: Palanivel Subramaniam, Richardson, TX (US); Austin Clay Styer, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 15/624,844

(22) Filed: Jun. 16, 2017

(51) Int. Cl.
| | |
|---|---|
| G05F 1/70 | (2006.01) |
| F24F 11/48 | (2018.01) |
| H02M 1/42 | (2007.01) |
| F24F 11/00 | (2018.01) |
| F25B 49/02 | (2006.01) |
| H02P 5/00 | (2016.01) |
| F24F 11/30 | (2018.01) |
| F24F 11/77 | (2018.01) |
| F24F 11/62 | (2018.01) |
| F24F 11/83 | (2018.01) |
| F24F 11/63 | (2018.01) |
| F24F 11/85 | (2018.01) |
| F24F 140/50 | (2018.01) |
| F24F 11/46 | (2018.01) |

(52) U.S. Cl.
CPC ......... *H02M 1/4208* (2013.01); *F24F 11/006* (2013.01); *F24F 11/008* (2013.01); *F24F 11/0079* (2013.01); *F24F 11/30* (2018.01); *F24F 11/62* (2018.01); *F24F 11/77* (2018.01); *F24F 11/83* (2018.01); *F25B 49/025* (2013.01); *H02P 5/00* (2013.01); *F24F 11/46* (2018.01); *F24F 11/63* (2018.01); *F24F 11/85* (2018.01); *F24F 2011/0046* (2013.01); *F24F 2011/0061* (2013.01); *F24F 2011/0075* (2013.01); *F24F 2011/0083* (2013.01); *F24F 2140/50* (2018.01); *F25B 2500/19* (2013.01); *F25B 2600/024* (2013.01); *F25B 2600/11* (2013.01)

(58) Field of Classification Search
CPC .................................. G05F 1/70; F24F 11/46
USPC .................................................. 318/437, 438
See application file for complete search history.

(56) References Cited

U.S. PATENT DOCUMENTS

| | | | |
|---|---|---|---|
| 7,315,790 B2 * | 1/2008 | Kindseth ............ | G01R 19/2513 361/111 |
| 8,508,166 B2 * | 8/2013 | Marcinkiewicz ... | H02M 1/4225 318/438 |
| 9,318,948 B2 * | 4/2016 | Joo .......................... | H02M 1/32 |

* cited by examiner

*Primary Examiner* — Bentsu Ro
(74) *Attorney, Agent, or Firm* — Baker Botts L.L.P.

(57) ABSTRACT

A system includes an alternating current (AC) to direct current (DC) voltage convertor, a power factor correction (PFC) subsystem, and one or more motor drives. The AC to DC voltage converter receives alternating current from an AC voltage source. The PFC subsystem receives DC voltage from the AC to DC voltage convertor. The PFC subsystem also outputs a corrected DC voltage corresponding to an output voltage setpoint. The PFC subsystem includes a controller operable to dynamically adjust the output voltage setpoint. The one or more motor drives receive voltage via the PFC subsystem. The output voltage setpoint is determined based at least in part on estimating a load associated with the one or more motor drives configured to receive voltage via the PFC subsystem.

20 Claims, 2 Drawing Sheets

HVAC AND/OR REFRIGERATION USING POWER FACTOR CORRECTION

TECHNICAL FIELD

This disclosure relates generally to a HVAC and/or refrigeration system, in particular, HVAC and/or refrigeration using power factor correction.

BACKGROUND

Existing HVAC and/or refrigeration systems typically include one or more motor drives, such as motor drives used to drive compressors and fans, which are used to condition, heat, cool, ventilate or otherwise control the conditions of a space. In existing conventional systems, motor drives in the HVAC and/or refrigeration system are supplied power via a power correction factor (PFC) subsystem. The PFC subsystem may increase the ratio between useful power transmitted and total power transmitted to the HVAC and/or refrigeration system. Conventionally, a PFC subsystem provides a constant bus voltage regardless of the load on the motor drives of the HVAC and/or refrigeration system. In light load situations at the HVAC and/or refrigeration system requiring less power, the PFC subsystem maintaining the constant bus voltage results in losses at the PFC subsystem and significant magnetic core losses in the motor drives of the HVAC and/or refrigeration system. Moreover, the constant bus voltage must be set high enough to support the peak voltages on the motor drive terminals. Thus, existing conventional systems sacrifice efficiency and resources at lighter loads by maintaining a high bus voltage to provide sufficient power to the motor drives for peak operation.

SUMMARY OF THE DISCLOSURE

According to one embodiment, a controller for a HVAC and/or refrigeration system includes one or more interfaces, memory, and processing circuitry. The one or more interfaces communicate with components of the HVAC and/or refrigeration system. The components of the HVAC and/or refrigeration system include a power factor correction (PFC) device and one or more motor drives. The memory stores instructions. The processing circuitry executes the instructions. By executing the instructions, the controller dynamically adjusts an output voltage setpoint for the PFC subsystem. The output voltage setpoint is determined based at least in part on estimating a load associated with the components of the HVAC and/or refrigeration system that receive voltage via the PFC subsystem.

According to another embodiment, a system includes an alternating current (AC) to direct current (DC) voltage convertor, a power factor correction (PFC) device, and one or more motor drives. The AC to DC voltage converter receives alternating current from an AC voltage source. The PFC subsystem receives DC voltage from the AC to DC voltage convertor. The PFC subsystem also outputs a corrected DC voltage corresponding to an output voltage setpoint. The PFC subsystem includes a controller operable to dynamically adjust the output voltage setpoint. The one or more motor drives receive voltage via the PFC subsystem. The output voltage setpoint is determined based at least in part on estimating a load associated with the one or more motor drives configured to receive voltage via the PFC subsystem.

According to yet another embodiment, a method includes estimating a load of a HVAC and/or refrigeration system. The HVAC and/or refrigeration system includes a PFC subsystem and one or more motor drives. The method further includes adjusting an output voltage setpoint for the PFC subsystem. The output voltage setpoint is determined based at least in part on estimating a load associated with the one or more motor drives of the HVAC and/or refrigeration system that receive voltage via the PFC subsystem.

Certain embodiments may provide one or more technical advantages. For example, certain embodiments allow the adjustment of the output voltage set point of the PFC subsystem which reduces of magnetic core losses in the motor drives and losses in the PFC subsystem at light load conditions while still providing sufficiently high voltage during peak operation. In this manner, HVAC and/or refrigeration system may operate more efficiently and with reduced maintenance. As another example, certain embodiments use the efficiency relationships of various components of the HVAC and/or refrigeration system to determine the output voltage set point of the PFC subsystem. For example, individual efficiency values of the one or more motor drives of the HVAC and/or refrigeration system at the commanded loads may be used by a controller of the PFC subsystem to determine the output voltage set point. In this manner, the efficiency of the HVAC and/or refrigeration system may be optimized while providing the adjustability of the output voltage. In certain embodiments, the efficiency of the entire HVAC and/or refrigeration system may be optimized. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
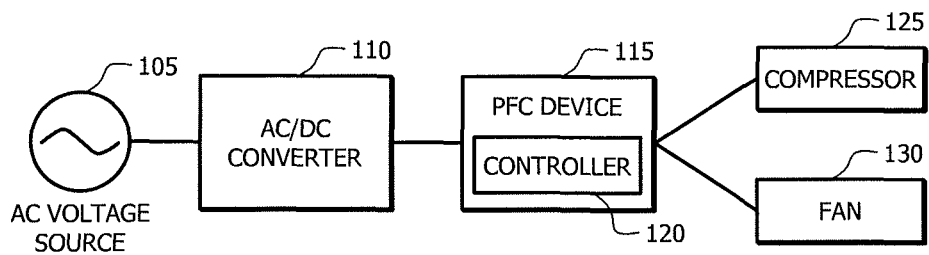
FIG. 1 illustrates an example HVAC and/or refrigeration system.

Embodiments of the present disclosure and its advantages are best understood by referring to FIGS. 1 through 4 of the drawings, like numerals being used for like and corresponding parts of the various drawings.

Existing conventional HVAC and/or refrigeration systems typically include one or more motor drives, such as motor drives in compressors and fans, which are used to control the environment in a space (e.g., remove heat or humidity from a space or ventilate the space). For example, a HVAC and/or refrigeration system may include a compressor that uses a motor to compress a refrigerant as part of a cooling cycle. As another example, an HVAC and/or refrigeration system may include a fan used to move air into or out of a space or over one or more components of the HVAC and/or refrigeration system. Typical HVAC and/or refrigeration systems include one or more power factor correction (PFC) subsystems. Power factor correction increases the amount of usable power transmitted to the one or more motor drives for a given total transmitted power. A system having a low power factor may be inefficient and unable to use all a significant portion of the power transmitted to it. A PFC subsystem may increase the power factor ratio closer to unity, allowing the HVAC and/or refrigeration system to utilize a greater portion of the transmitted power. In existing HVAC and/or refrigeration systems, a PFC subsystem provides a constant bus voltage that is used by the HVAC and/or refrigeration system to supply power to one or more motor drives. The PFC subsystem must provide a bus voltage at least as high as the peak voltages on the one or more motor terminals to allow the motor drives to operate at the commanded levels. If the PFC subsystem provides a bus voltage lower than the necessary voltage required by the motor, the motor may not draw enough power to operate at the commanded level preventing the desired conditioning of the space.

In existing systems, the PFC subsystem bus voltage is not adjustable based on the different load conditions of the HVAC and/or refrigeration system. For example, even in light load circumstances, the same high, bus voltage is supplied to the one or more motor drives of the HVAC and/or refrigeration system. The disparity between the high bus voltage and the needs of the one or more motor drives of the HVAC and/or refrigeration system result in magnetic core losses in the one or more motor drives and losses at the PFC subsystem. While a lower bus voltage may prevent some of these losses, the voltage set at the PFC subsystem must be set high enough to supply adequate power to the HVAC and/or refrigeration system during peak operation conditionings. Thus, existing conventional systems make the tradeoff between losses at low capacity and the ability to operating the HVAC and/or refrigeration system at or near peak capacity.

Furthermore, PFC subsystems or modules in existing systems are not communicable or connected with the various components of the HVAC and/or refrigeration system. As a result, existing PFC subsystems, including controllers thereof, are unable to determine the load condition of the HVAC and/or refrigeration system and other information that may be used to determine the optimal output voltage. Thus, what is desired are systems and methods in which the PFC subsystem, or a controller thereof, may receive information from the HVAC and/or refrigeration system in order to control the output voltage set point of the PFC subsystem.

As discussed above, there is a tradeoff between being able to operate the one or more motor drives at full capacity and sacrificing efficiency in the PFC subsystem and motor drives at lighter loads. What is desired are systems and methods which preclude such a tradeoff. This disclosure discloses various embodiments of systems and methods that avoid the aforementioned tradeoff by providing control of the PFC subsystem bus voltage based at least in part on the load of a HVAC and/or refrigeration system. For example, certain embodiments may allow the downward adjustment of the bus voltage during light load situations and upward adjustment of the bus voltage to provide a commanded power at the one or more motor drives. A further advantage of embodiments disclosed herein is the adjustment of the bus voltage of the PFC subsystem based not only on the load of the one or more motor drives but also the combined efficiency and/or individual efficiencies of the one or more motor drives and the PFC subsystem. In this manner, the HVAC and/or refrigeration system may operate at a bus voltage from the PFC subsystem that provides the best efficiency of the overall system at a particular load of the system.

FIG. 1 depicts an example HVAC and/or refrigeration system 100. HVAC and/or refrigeration system 100 may include components of one or more of an HVAC system and a refrigeration system. For example, HVAC and/or refrigeration system 100 may include one or more motor drives to drive a compressor, fan, condenser, evaporator, and/or any other suitable component used in an HVAC system or a refrigeration system or any combination thereof. In the illustrated embodiment of FIG. 1, HVAC and/or refrigeration system 100 may include an AC voltage source 105, an AC/DC converter 110, a PFC subsystem 115, a compressor 125 and a fan 130. In certain embodiments, AC voltage source 105 may produce alternating current voltage for HVAC and/or refrigeration system 100. For example, AC voltage source 105 may be alternating current provided from the utility at a commercial building or residence at 220 volts. While certain embodiments disclosed herein refer to an alternating current, other embodiments of HVAC and/or refrigeration system 100 may include a direct current voltage source in addition, or in place of AC voltage source 105 and AC/DC converter 110.

AC/DC converter 110 may convert voltage from AC voltage source 105 to a DC voltage. The DC voltage provided by AC/DC converter 110 may be applied at PFC subsystem 115. In certain embodiments, AC/DC converter 110 may be removed if the voltage source is direct current instead of alternating current. In certain embodiments, AC/DC converter 110 may be replaced or supplemented with a stepdown converter or other voltage transforming device, such as a transformer, if the voltage source is a DC voltage source instead of, or in addition to, AC voltage source 105.

Components of HVAC and/or refrigeration system 100 may receive power from PFC subsystem 115. In certain embodiments, PFC subsystem 115 may include controller 120. PFC subsystem 115 may be configured to increase the power factor of HVAC and/or refrigeration system 100, e.g., closer to unity. For example, PFC subsystem 115 may reduce the reactive power of the components of HVAC and/or refrigeration system 100, such as one or more motor drives and their respective inverters, to increase the proportion of the transmitted power used by HVAC and/or refrigeration system 100.

In certain embodiments, HVAC and/or refrigeration system 100 may include one or more motor drives, which may include one or more inverters. Each motor drive may drive a component of HVAC and/or refrigeration system 100, such as compressor, a fan, or other component. For example, in the illustrative embodiment in FIG. 1, HVAC and/or refrigeration system 100 may include at least one compressor 125 and at least one fan 130. Compressor 125 and fan 130 may receive power, e.g., voltage, via PFC subsystem 115. Not illustrated in example HVAC and/or refrigeration system 100 are inverters which may be disposed between PFC subsystem 115 and compressor 125 and fan 130, or motor drives thereof. PFC subsystem 115 may provide a bus voltage coupled to compressor 125 and fan 130. For example, compressor 125 may use power supplied by the voltage to compress a refrigerant in order to remove heat from a space and fan 130 may use the power supplied by the voltage to move a heat transfer media, e.g., ambient air, over coils to remove heat from a refrigerant. Compressor 125 and fan 130 are merely examples of components of HVAC and/or refrigeration system 100 that may include motor drives that use voltage corrected by power factor correction to condition a space. In certain embodiments, HVAC and/or refrigeration system may include additional components, including additional fans and compressors, as well as different components such as indoor blower drives.

While illustrated as including compressor 125 and fan 130, HVAC and/or refrigeration system 100 may include any component or plurality of components, and any combination thereof, that are used in an HVAC and/or refrigeration system. For example, HVAC and/or refrigeration system 100 may include one or more fans with or without including a compressor. As another example, HVAC and/or refrigeration system 100 may include one or more indoor or outdoor blowers. In another example, HVAC and/or refrigeration system 100 may include one or more compressors with or within any fan or blower. In this manner, HVAC and/or refrigeration system 100 may include any suitable components of one or more of an HVAC and refrigeration system that uses one or more motor drives to drive its components.

Figure 2:
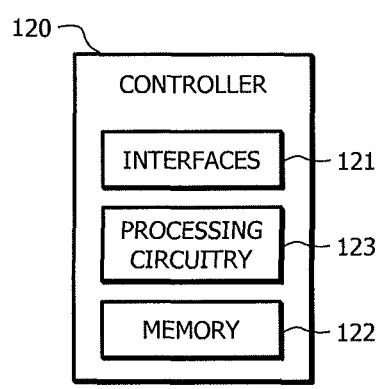
FIG. 2 illustrates an example controller for a HVAC and/or refrigeration system having a power factor correction device.

FIG. 2 illustrates an example controller 120 used in HVAC and/or refrigeration system 100. Controller 120 may include one or more interfaces 121, memory 122, and processing circuitry 123. Interface 121 receives input (e.g., sensor data or system data), sends output (e.g., instructions), processes the input and/or output, and/or performs other suitable operation. Interface 121 may comprise hardware and/or software. As an example, interface 121 receives information (e.g., voltage or current supplied) about one or more components of refrigeration system 100 (e.g., via sensors).

Memory (or memory unit) 122 stores information. As an example, memory 122 may store method 300. Memory 122 may comprise one or more non-transitory, tangible, computer-readable, and/or computer-executable storage media. Examples of memory 122 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Processing circuitry 123 may include any suitable combination of hardware and software implemented in one or more modules to execute instructions and manipulate data to perform some or all of the described functions of controller 120. In some embodiments, processing circuitry 123 may include, for example, one or more computers, one or more central processing units (CPUs), one or more microprocessors, one or more applications, one or more application specific integrated circuits (ASICs), one or more field programmable gate arrays (FPGAs), and/or other logic.

In certain embodiments, controller 120 includes processing circuitry 123 which executes instructions in memory 122 whereby controller 120 dynamically adjusts an output voltage set point for PFC subsystem 115. In certain embodiments, the output voltage set point may be determined based at least in part on estimating load associated with the components of HVAC and/or refrigeration system 100 receiving voltage via PFC subsystem 115. For example, in HVAC and/or refrigeration system 100 the output voltage set point may be determined based on the load of compressor 125 and fan 130 at a particular operational state. For instance, when the load of compressor 125 and fan 130 is low, controller 120 may set a low output voltage set point for PFC subsystem 115. Based on the set point, PFC subsystem 115 may supply a lower bus voltage to components of HVAC and/or refrigeration system 100. In this manner, using controller 120, PFC subsystem 115 may limit magnetic core losses in one or more motor drives of HVAC and/or refrigeration system by reducing supplying a lower bus voltage while still maintaining threshold bus voltage sufficient for the current operational status of the motor drives, for example, based on the current loads of compressor 125 and fan 130.

In certain embodiments, controller 120 determines the output voltage set point by determining a target efficiency value for HVAC and/or refrigeration system 100 based on the load and determining the output voltage set point based on the target efficiency value. For example, HVAC and/or refrigeration system 100 may have a total efficiency value based, at least in part, on the load of its individual components. For example, HVAC and/or refrigeration system 100 may operate at different efficiencies based on the load and the voltage supplied, e.g., via the bus voltage supplied by PFC subsystem 115. In some embodiments, the total efficiency value may be determined using one or more efficiency curves, which are plots or curves representing the efficiency of a component, such as a particular motor drive, at various loads over a range of input voltages. For example, an efficiency curve may be a series of curves corresponding to different loads and illustrate the efficiency over a voltage. There may be some range of voltages in which one or more components of HVAC and/or refrigeration system 100 operate most efficiently. In this manner, controller 120 may determine a target efficiency value for HVAC and/or refrigeration system 100 based on the efficiency of the one or more motor drives or other components of HVAC and/or refrigeration system including PFC subsystem 115 and may use the determined target efficiency value to determine the output voltage set point. As a result, the output voltage set point set by controller 120 may be based on providing the optimal efficiency for a given load condition. Thus, certain embodiments of HVAC and/or refrigeration system 100 may use controller 120 to modulate the output voltage set point to provide optimal efficiency for any given load condition, while still providing sufficient power to meet that commanded capacity.

In certain embodiments, controller 120 may also determine individual efficiency values for each of PFC subsystem 115 and the one or more motor drives of HVAC and/or refrigeration system 100 based on the load. As an example, controller 120 may determine individual efficiency values for each of PFC subsystem 115, the motor drive of compressor 125, and the motor drive of fan 130. Controller 120 may then calculate the target efficiency value for the HVAC and/or refrigeration system 100 based on the individual efficiency values. For example, controller 120 may determine individual efficiency values based on efficiency curves for each individual component of HVAC and/or refrigeration system 100 and then compile those values into a target efficiency value. In this manner, controller 120 may take into account the efficiency of the entire system of HVAC and/or refrigeration system 100 and not just individual components by themselves. For example, a particular output voltage set point may provide the optimal voltage for compressor 125, but that same output set point may cause overriding inefficiencies for fan 130. In this manner, controller 120 may take into account the differing efficiency relationships between load and voltage that may occur between different components, such as different motor drives of HVAC and/or refrigeration system 100. Controller 120 may use any suitable algorithm or combining method in order to calculate the target efficiency value. For example, a weighted efficiency calculation may be made based on efficiency curves or which take into account the total power consumed by each component.

In certain embodiments, the individual efficiency values are based on predetermined efficiency curves stored in memory 122 of the controller 120. For example, during manufacturing or during installation controller 120 may be loaded with efficiency tables or curves based on the components serviced by PFC subsystem 115. In this manner, controller 120 may access efficiency curves in memory 122 without any external communication. In other embodiments, individual efficiency values may be received by controller 120 through the one or more interfaces 121. For example, components of HVAC and/or refrigeration system 100 may communicate its efficiency value or set of efficiency curves to controller 120. In another example, efficiency values may be communicated over a network to controller 120. In yet another example, an operator may provide efficiency values during installation of HVAC and/or refrigeration system 100 or additional components thereof. In certain embodiments, the individual efficiency values may be determined based on monitoring the component during operation of HVAC and/or refrigeration system 100.

In certain embodiments, controller 120 may maintain output voltage set point for PFC subsystem 115 at or above a peak input voltage supplied to PFC subsystem 115. For example, controller 120 may maintain output voltage set point for PFC subsystem 115 at or above a peak input voltage supplied by AC/DC voltage converter 110. In certain embodiments, controller 120 may determine that an output voltage set point below the peak input voltage from AC/DC voltage converter 110 is the most efficient based on the entire HVAC and/or refrigeration system 100. However, if PFC subsystem 115 were to provide a bus voltage below the peak input voltage from AC/DC voltage converter 110, HVAC and/or refrigeration system 100 may suffer significant losses and potential damage, e.g., from peak charging. Controller 120 may prevent this from occurring by containing instructions in memory 122 and using processing circuitry 123 to override a determination of output voltage set point that is below this value. In some embodiments the peak input voltage value is stored in memory 122 or, alternatively, may be determined using information communicated through interface 121 to controller 120.

In certain embodiments, controller 120 may also dynamically adjust the output voltage set point for the PFC subsystem 115 during operation of HVAC and/or refrigeration system 100. For example, in certain embodiments the output voltage set point dynamically adjusts during operation of the one or more motor drives, such as the motor drives used to drive compressor 125 and fan 130. In this manner, efficiency maintained and adjusted to produce the most efficient conditions during operation of HVAC and/or refrigeration system 100 without requiring manual intervention or interruption of operation of HVAC and/or refrigeration system 100.

In certain embodiments, PFC subsystem 115 may include a three-channel interleaved PFC subsystem. An interleaved PFC subsystem may include multiple PFC subsystems which are interleaved in order to produce a total output voltage to the one or more motor drives of HVAC and/or refrigeration system 100. For example, in a three-channel interleaved PFC subsystem, three PFC modules may be configured in parallel such that the three PFC modules may produce a voltage that may be combined or may be provided at different times to various components of HVAC and/or refrigeration system 100. This may have a number of advantages. For example, PFC modules may be combined to provide higher voltages than each individual PFC module may provide. In addition, a reduced input current ripple and a minimized root mean squared current in each of the PFC modules may be realized in an interleaved PFC. Thus, even if more components are needed for a channel interleaved PFC subsystem, these components may be smaller and provide a better distribution of heating in PFC subsystem 115.

HVAC and/or refrigeration system 100, as depicted in FIG. 1, is depicted with at least two motor drives used to drive compressor 125 and fan 130, which are illustrated as being configured in parallel and coupled to PFC subsystem 115. Other configurations may be contemplated under this disclosure. For example, in certain embodiments, HVAC and/or refrigeration system 100 may include one or more motor drives connected in series. In certain embodiments, one or more motor drives may be connected in parallel. In even further embodiments, one or more motor drives may be connected in series and in parallel. For example, four motor drives may be paired into two pairs such that each pair is connected in series and the two pairs are connected in parallel. Other such configurations may be contemplated as may be understood by a person having skill in the art.

In certain embodiments, the target efficiency value is further based on the configuration of the one or more motor drives of HVAC and/or refrigeration system 100. For example, HVAC and/or refrigeration system 100 including two or more motor drives in series may have a different target efficiency value than with two or more motor drives configured in parallel. In this manner, controller 120 may include instructions in memory 122 that when run, may cause processing circuitry 123 to determine the configuration and determine the target efficiency value using information about the configuration of the motor drives driving the components of HVAC and/or refrigeration system 100, in addition to the load condition. In certain embodiments where individual efficiency values may be used, controller 120 may be configured to adjust the algorithm or calculation using the individual efficiency values based on the configuration of the one or more motor drives, such as the motor drives used to drive compressor 125 and fan 130.

Certain embodiments of HVAC and/or refrigeration system 100 and controller 120 of PFC subsystem 115 may provide one or more technical advantages. For example, certain embodiments may allow the adjustment of the output voltage set point of the PFC subsystem which reduces of magnetic core losses in the motor drives and losses in the PFC subsystem at light load conditions while still providing sufficiently high voltage during peak operation. In this manner, HVAC and/or refrigeration system may operate more efficiently and with reduced maintenance. As another example, certain embodiments use the efficiency relationships of various components of the HVAC and/or refrigeration system to determine the output voltage set point of the PFC subsystem. For example, individual efficiency values of the one or more motor drives of the HVAC and/or refrigeration system at the commanded loads may be used by a controller of the PFC subsystem to determine the output voltage set point. In this manner, the efficiency of the HVAC and/or refrigeration system may be optimized while providing the adjustability of the output voltage. In certain embodiments, the efficiency of the entire HVAC and/or refrigeration system may be optimized. Certain embodiments may include none, some, or all of the above technical advantages. One or more other technical advantages may be readily apparent to one skilled in the art from the figures, descriptions, and claims included herein.

Figure 3:
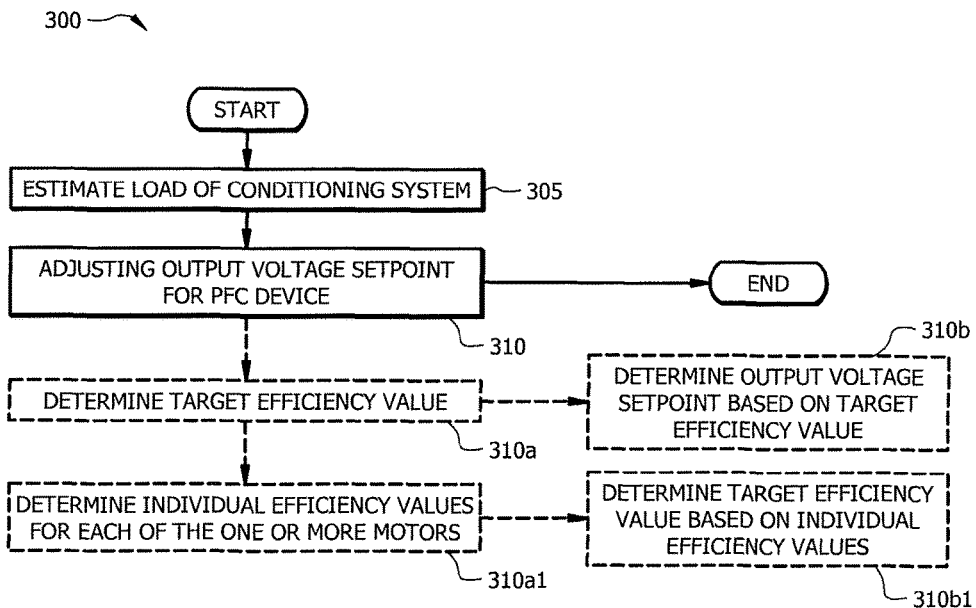
FIG. 3 is a flowchart illustrating a method of operating the example cooling system of FIG. 1.

FIG. 3 is a flowchart illustrating a method 300 of operating example HVAC and/or refrigeration system 100 of FIG. 1. In particular embodiments, various components of HVAC and/or refrigeration system 100 perform the steps of method 300. Method 300 may begin with step 305. In step 305, a load of HVAC and/or refrigeration system 100 may be estimated. For example, HVAC and/or refrigeration system 100 may include PFC subsystem 115 and one or more motor drives, such as motor drives used to drive compressor 125 and fan 130. The load may be estimated based on the total load of the components including the one or more motor drives and the PFC subsystem 115.

After the load is estimated, method 300 may move to step 310. At step 310, an output voltage set point for PFC subsystem 115 may be adjusted. The output voltage set point may be determined at least in part based on the estimated load of the one or more motor drives of the HVAC and/or refrigeration system that receive voltage via PFC subsystem 115. For example, the efficiency of a particular output voltage set point may be determined using at least in part the load associated with the one or more motor drives. In particular, the load of compressor 125 and fan 130 may be used to determine an output voltage set point in step 310.

In certain embodiments, method 300 may comprise substeps. For example, step 310 may include substep 310a where a target efficiency value for the HVAC and/or refrigeration system is determined based on the estimated load. After determining the target efficiency value, step 310 may also include substep 310b where the output voltage of the PFC subsystem 115 is determined based on the target efficiency value.

In certain embodiments, substep 310a may comprise further substeps. For example, in certain embodiments, step 310 may include substeps 310a1 and 310a2. At substep 310a1, individual efficiency values for each of the one or more motor drives and PFC subsystem 115 may be determined based on the estimated load. At substep 310a2, the target efficiency value for HVAC and/or refrigeration system 100 may be calculated using the individual efficiency values. In this manner, individual efficiency values may be used to provide an overall efficiency value such as target efficiency value, which may be used to determine the output voltage set point. In this manner, condition system 100 may be operated at the appropriate output voltage from PFC subsystem 115 in order to provide the most efficient operation while also preventing reduction of capacity when needed at the one or more motor drives, such as the motor drives used to drive compressor 125 and fan 130.

In certain embodiments, method 300 may be carried out by controller 120. For example, method 300 may be carried out such that the output voltage set point of PFC subsystem 115 is adjusted dynamically during the operation of at least one compressor and at least one fan of the HVAC and/or refrigeration system 100 using controller 120.

In certain embodiments, the output voltage set point is determined to be at or above a peak input voltage to PFC subsystem 115. For example, if determined in step 305, based on the estimated load of HVAC and/or refrigeration system 100, that the output voltage set point should be lower than the peak voltage from AC/DC converter 110, method 300 may further include a step of adjusting output voltage set point above or at said peak input voltage, e.g., from AC/DC converter 110. In this manner, method 300 may prevent failures at PFC subsystem 115 as a result of peak charging.

In certain embodiments, each of the one or more motor drives, such as in compressor 125 or fan 130, may be controlled by processing circuitry separate from controller 120 of PFC subsystem 115. As an example, compressor 125 and fan 130 may each have one or more CPUs controlling various operations of each of those components of HVAC and/or refrigeration system 100. In certain embodiments, multiple CPUs controlling one or more motor drives may communicate with PFC controller 120 through the one or more interfaces 121. In this manner, controller 120 may receive information relating to the load on the one or more motor drives. In addition, controller 120 may receive information from the one or more motor drives indicating various efficiency values or curves which may indicate the efficiency of various loads and/or voltages. Controller 120 may use that information to adjust the output voltage setting point for PFC subsystem 115 as described in various embodiments herein.

In certain embodiments, HVAC and/or refrigeration system 100 may include a signaling system connecting one or more components of HVAC and/or refrigeration system 100. The signaling system may facilitate the adjustment of the bus voltage command such as adjusting the output voltage set point of PFC subsystem 115. In addition, signaling system may communicate the determined output voltage set point and/or the load conditions at various components in HVAC and/or refrigeration system 100. For example, signaling condition may provide communication channels between one or more motor drives used to drive compressor 125, fan 130, and PFC subsystem 115, including controller 120.

In certain embodiments, actual total output real power from all inverters, e.g., inverters connected to one or more motor drives, may be calculated. Based on this calculated value, a minimum desired bus voltage may be determined. For example, output voltage set point may be set at or above the calculated value. As a result, PFC subsystem 115 may provide sufficient voltage to power the one or more motor drives at the desired capacity and prevent the setting of an output voltage set point below that value, thereby maintaining the capacity of HVAC and/or refrigeration system 100 during peak operation.

In certain embodiments, based on the operating conditions, a bus voltage less than the input peak voltage to PFC subsystem 115 may be determined using the logic provided in HVAC and/or refrigeration system 110. Controller 120 of PFC subsystem 115 or another controller, such as a supervisory controller, may prevent output voltage set point from being set below the input peak voltage, thereby preventing peak charging.

In particular embodiments, method 300 further comprises additional steps. These additional steps may correspond to different embodiments of HVAC and/or refrigeration system 100, as described above. Modifications, additions, or omissions may be made to method 300 depicted in FIG. 3. Method 300 may include more, fewer, or other steps. For example, steps may be performed in parallel or in any suitable order. While discussed as various components of HVAC and/or refrigeration system 100 performing the steps, any suitable component or combination of components of HVAC and/or refrigeration system 100 may perform one or more steps of the method.

Figure 4:
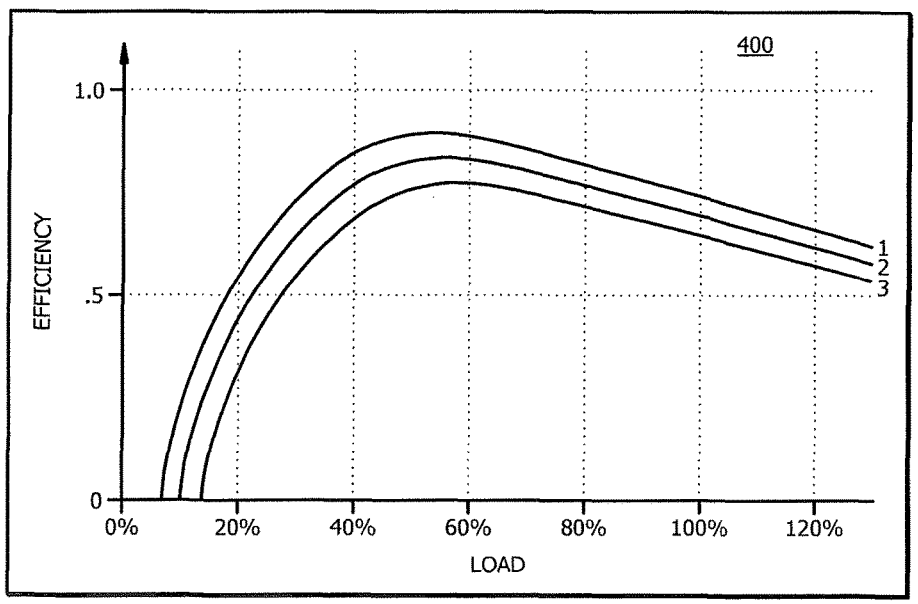
FIG. 4 illustrates example efficiency curves for one or more motor drives.

FIG. 4 illustrates an example efficiency plot 400 for a motor drive, such as a motor drive used to drive compressor 125 or fan 130. Efficiency plot 400 plots the efficiency, e.g., the percentage of mechanical energy produced from a given amount of electrical energy, over the load on the motor drive. Efficiency plot 400 depicts 3 curves, curve 1, curve 2, and curve 3, which illustrate the efficiency-load relationship for three different circumstances of operating the motor drive. For example, the different curves may represent different power factor correction, different applications, different supplied voltages, or different configurations with other components. While three such curves are depicted in FIG. 3, any number of efficiency curves may be included in an efficiency plot, such as efficiency plot 400.

In certain embodiments, efficiency may be measured as a function of the load on a motor drive, which in turn may be calculated using the voltage supplied to the motor drive. In the example of a blower or a fan motor drive, the load (e.g, the power of the drive) may be substantially proportion to the cube of the speed of the motor. The speed of the motor may be proportional to the input voltage of the motor. The switching losses of the motor may decrease with a decrease of voltage applied to the motor above a certain operating voltage. For example, efficiency may be linearly proportion to a decrease in voltage in the operating range of the motor. For example, efficiency plot 400 shows the decrease of efficiency as a function of the load, e.g., the supplied voltage, above a certain load level.

Different components may have different relationships between the load, speed, and voltage. For example, the power or load of a compressor motor may not follow a polynomial relationship with the speed of the motor. In some embodiments, the relationship between the load and the speed of the motor in a compressor is application dependent. In this manner, the efficiency relationships, such as efficiency plot 400, may differ based on only on the load of the motor drive, but also the type of motor drive and its particular application. Accordingly, in some embodiments, the efficiency plot 400 may be tailor specifically to a class of components and/or to a particular application or arrangement of components of the HVAC and/or refrigeration system.

In certain embodiments, the values of the various points on the one or more curves of efficiency plot 400 may be used by controller 120 of PFC subsystem 115 to determine the target efficiency value. For example, for each motor of HVAC and/or refrigeration system 100, there may be an efficiency plot corresponding to that particular motor. The values may be stored in a table, matrix, or any suitable form to be usable by controller 120. For example, the various values corresponding to the efficiency relationship may be stored in memory 122 or other storage memory accessible or communicable with controller 120.

Efficiency plot 400 is merely one example of information indicating the efficiency of a motor. Persons having skill in the art may recognize other such information that may be used by controller 120 of PFC subsystem 115 to determine a target efficiency value according to the various embodiments disclosed herein.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A controller for a HVAC and/or refrigeration system, the controller comprising:
one or more interfaces operable to communicate with components of the HVAC and/or refrigeration system, the components comprising a power factor correction (PFC) subsystem and one or more motor drives;
memory operable to store instructions; and
processing circuitry operable to execute the instructions, whereby the controller is operable to dynamically adjust an output voltage setpoint for the PFC subsystem, the output voltage setpoint determined based at least in part on estimating a load associated with one or more components of the HVAC and/or refrigeration system that receive voltage via the PFC subsystem.

2. The controller of claim 1, wherein to determine the output voltage setpoint based at least in part on estimating the load, the controller is further operable to:
determine a target efficiency value for the HVAC and/or refrigeration system based on the load; and
determine the output voltage setpoint based on the target efficiency value.

3. The controller of claim 2, wherein to determine the target efficiency value for the HVAC and/or refrigeration system, the controller is further operable to:
determine individual efficiency values for each of the PFC subsystem and the one or more motor drives based on the load; and
calculate the target efficiency value for the HVAC and/or refrigeration system based on the individual efficiency values.

4. The controller of claim 1, wherein the output voltage setpoint is determined based on a load of a single component of the HVAC and/or refrigeration system that receives voltage via the PFC subsystem.

5. The controller of claim 1, wherein the output voltage set is determined based on a total load of the one or more components of the HVAC and/or refrigeration system that receive voltage via the PFC subsystem.

6. The controller of claim 1, wherein to dynamically adjust the output voltage setpoint for the PFC subsystem, the controller is further operable to maintain the output voltage setpoint for the PFC subsystem at or above a peak input voltage to the PFC subsystem.

7. The controller of claim 1, wherein the controller is operable to dynamically adjust the output voltage setpoint for the PFC subsystem during operation of the one or more motor drives.

8. A system, comprising:
an alternating current (AC) to direct current (DC) voltage convertor receiving alternating current from an AC voltage source;
a PFC subsystem configured to receive DC voltage from the AC to DC voltage convertor and output a corrected DC voltage corresponding to an output voltage setpoint, the PFC subsystem comprising a controller operable to dynamically adjust the output voltage setpoint;
one or more motor drives configured to receive voltage via the PFC subsystem;
wherein the output voltage setpoint is determined based at least in part on estimating a load associated with the one or more motor drives configured to receive voltage via the PFC subsystem.

9. The system of claim 8, wherein to determine the output voltage setpoint based at least in part on estimating the load, the controller is further operable to:
determine a target efficiency value for the PFC subsystem and the one or more motor drives based on the load; and
determine the output voltage setpoint based on the target efficiency value.

10. The system of claim 9, wherein to determine the target efficiency value for the PFC subsystem and the one or more motor drives, the system is further operable to:
determine individual efficiency values for each of the one or more motor drives and the PFC subsystem based on the load; and calculate the target efficiency value for the PFC subsystem and the one or more motor drives based on the individual efficiency values.

11. The system of claim 8, wherein to dynamically adjust the output voltage setpoint for the PFC subsystem, the system is further operable to maintain the output voltage setpoint for the PFC subsystem at or above a peak input voltage from an AC/DC voltage converter to the PFC subsystem irrespective of the estimated load.

12. The system of claim 8, wherein the PFC subsystem comprises a three-channel interleaved PFC.

13. The system of claim 8, wherein the system is operable to dynamically adjust the output voltage setpoint for the PFC subsystem during operation of the one or more motor drives.

14. The system of claim 8, wherein the one or more motor drives are connected in series.

15. The system of claim 8, wherein the one or more motor drives are connected in parallel.

16. The system of claim 8, wherein the target efficiency value is further based on a configuration of the one or more motor drives of the HVAC and/or refrigeration system.

17. A method, comprising:
  estimating a load of a HVAC and/or refrigeration system, the HVAC and/or refrigeration system comprising a PFC subsystem and one or more motor drives; and
  adjusting an output voltage setpoint for the PFC subsystem, the output voltage setpoint determined based at least in part on estimating a load associated with the one or more motor drives of the HVAC and/or refrigeration system that receive voltage via the PFC subsystem.

18. The method of claim 17, wherein adjusting the output voltage of the PFC subsystem comprises:
  determining a target efficiency value for the HVAC and/or refrigeration system based on the estimated load; and
  determining the output voltage setpoint of the PFC subsystem based on the target efficiency value.

19. The method of claim 18, wherein determining the target efficiency value for the HVAC and/or refrigeration system comprises:
  determining individual efficiency values for each of the one or more motor drives and the PFC subsystem based on the estimated load; and
  calculating the target efficiency value for the HVAC and/or refrigeration system based on the individual efficiency values.

20. The method of claim 17, wherein the output voltage setpoint is determined to be at or above a peak input voltage to the PFC subsystem irrespective of the estimated load.

\* \* \* \* \*